United States Patent
Ager

[15] 3,678,106
[45] July 18, 1972

[54] OXIDATION OF P-XYLENE AND P-TOLUIC ACID TO TEREPHTHALIC ACID IN AQUEOUS MEDIUM

[72] Inventor: John W. Ager, Princeton, N.J.
[73] Assignee: FMC Corporation, New York, N.Y.
[22] Filed: April 2, 1970
[21] Appl. No.: 25,251

[52] U.S. Cl. .............................................. 260/524 R
[51] Int. Cl. .............................................. C07c 63/02
[58] Field of Search .................................. 260/524 R

[56] References Cited

UNITED STATES PATENTS

| | | | |
|---|---|---|---|
| 2,391,740 | 12/1945 | Raley et al. | 260/524 |
| 3,532,746 | 10/1970 | Ember | 260/524 |
| 2,644,840 | 7/1953 | Roebuck | 260/524 |

OTHER PUBLICATIONS

Cassidy, " Adsorption and Chromatography," 1951, p. 178.

Primary Examiner—Lorraine A. Weinberger
Assistant Examiner—R. S. Weissberg
Attorney—Robert D. Jackson and Milton Zucker

[57] ABSTRACT

Terephthalic acid (TPA) is produced by the oxidation of p-xylene and/or p-toluic acid (PTA) with elemental oxygen in aqueous medium at elevated temperatures and pressures and in the absence of a conventional metal catalyst, using instead hydrogen bromide as catalyst, preferably together with small amounts of nitric acid. With p-xylene, active charcoal is additionally needed to insure adequate reaction.

5 Claims, No Drawings

OXIDATION OF P-XYLENE AND P-TOLUIC ACID TO TEREPHTHALIC ACID IN AQUEOUS MEDIUM

BACKGROUND OF THE INVENTION

Terephthalic acid (TPA) has become an important basic chemical since the advent of polyester fibers, which utilize it as a principal raw material. It is generally produced by the oxygenation of p-xylene, either in a single stage or in multiple stages with p-toluic acid (PTA) as the principal intermediate stage.

Most processes involve metallic catalysts, which must be recovered in working up the product from the crude reaction mixture, and which are both expensive and a source of potential pollution if not recovered efficiently. Since recovery of catalyst is also expensive, a process not needing metallic catalysts would be highly useful, provided it did not produce other cost and pollution problems.

British Pat. No. 793,192, published Apr. 9, 1958, suggests a process which is free of metallic catalyst. In accordance with that patent, p-toluic acid may be converted to TPA by treatment with air at elevated temperature and pressure, using concentrated (40 percent) nitric acid as the suspending agent. The problem this presents is that, although the bulk of the oxidation is done by elemental oxygen, a substantial amount of nitric acid is used up in the process, and all vent gases must be scrubbed to prevent atmospheric pollution by nitrogen oxides.

OBJECTS OF THE INVENTION

This invention has as its principal object the provision of a method for producing terephthalic acid from p-xylene and/or p-toluic acid without using metallic catalysts, in which water is the suspending agent, and catalytic additives are used in such small quantities that pollution problems are minimal.

STATEMENT OF THE INVENTION

In accordance with the instant invention, p-xylene and/or p-toluic acid (PTA) are oxidized to terephthalic acid (TPA) in good yields by oxygenation with elemental oxygen in aqueous medium at elevated temperatures and pressures, catalyzing the reaction by the use of hydrogen bromide, using about 0.04 to 20 mols of bromide per mol of p-xylene and/or PTA, preferably 0.04 to 1.0 mol, and the case of p-xylene, by the additional use of activated carbon, and preferably also using about 0.01 to 0.1 mol of nitric acid per mol of p-xylene and/or PTA.

DETAILED DESCRIPTION OF THE INVENTION

The raw material to be oxidized, in accordance with this invention, is p-xylene, or the intermediate oxidation product p-toluic acid (PTA). The PTA may be made by any conventional method, and can be made by oxidation of p-xylene in known fashion.

To practice the instant invention, the raw material is processed in aqueous medium. I have used as little as 6 mols of water per mol of xylene (about equal weights) to as much as 8,000 mols per mol. The ratio is obviously not important, being selected to be enough to dissolve the hydrogen bromide and nitric acid used, and to facilitate handling.

The oxygen for the reaction may come from air, be supplied as pure oxygen gas, or in any mixture of oxygen with other gases. Any elementary oxygen can be used which is available economically; I prefer oxygen gas, undiluted.

The oxygen is preferably supplied to the reaction mixture under pressure of about 50 psig (pounds per square inch gage) or higher, measured at room temperature; up to about 500 psig, some improvement is noted in reaction time. Above this point, no improvement is noted, so that higher pressures become uneconomic.

Reaction temperatures can be varied from about 150° to 250° C.; below 150° C., reaction is slower, while above 250° C. undesirable side reactions may occur.

Hydrogen bromide is essential for catalyzing the reaction. A minimum of about 0.04 mols per mol of p-xylene and/or PTA is necessary to get the reaction to go fairly well. Optimum results are obtained with about 0.1 mol of hydrogen bromide per mol of charge, although substantially more is desirable — up to equimolar amounts — when no nitric acid is present. More can be used, but is not economic; I have used as much as 20 mols per mol of charge.

Nitric acid is an optional ingredient, but it is cheaper than hydrogen bromide, and a very little of it is much more effective than the same amount of additional hydrogen bromide in acting to catalyze the reaction. I prefer to use from about 5 to 25 percent of 100% nitric acid, based on hydrogen bromide, in my catalyst mix. This is a very small amount based on charge weight, of the order of less than 1 percent to a few percent by weight.

Where PTA is being oxidized, hydrogen bromide, preferably together with nitric acid, is satisfactory. But with p-xylene, it is necessary to add active carbon to get the reaction moving. Substantial quantities of charcoal are used — from about 10 percent by weight based on p-xylene up. I have used up to 300 percent; since the carbon is easily recoverable and can be re-used, the amount charged is economically unimportant.

Reaction times are very rapid, results being obtained in from about 10 minutes to about an hour. Because of the high reaction rates, and the utility of water as a medium, the process can easily be carried out continuously in an overflow reaction with the proper hold-up time.

Yields of TPA from xylene have been up to about 70 to 80 percent; with very high conversions; yields from PTA have been about 90 percent.

EXAMPLES OF THE INVENTION

The following typical examples of the invention are given by way of illustration and are not intended to limit the invention.

Example 1 — p-toluic acid oxidation, no charcoal

A mixture of 6.8 g (0.05 m) p-toluic acid, 2 ml (0.016 m) xylene, 25 ml water, 0.4 g (0.005 m) hydrogen bromide and 0.05 g (0.0008 m) nitric acid was put in a glass liner in a titanium autoclave with 300 psig oxygen (measured at room temperature). The mixture was heated at 200° C. for 15 minutes. The product was 9.5 g TPA, 100 percent conversion, 86 percent yield.

Example 2 — p-toluic acid, no charcoal

A mixture of 6.7 g (0.05 m) p-toluic acid, 2 ml (0.016 m) p-xylene, 0.4 g (0.005 m) hydrogen bromide and 0.1 g (0.0016 m) nitric acid, and 25 ml H$_2$O was put in a glass liner in a titanium autoclave with 300 psig oxygen. The mixture was heated at 180° C. for 30 minutes. The solid product weighed 8.9 g. TPA yield 81 percent.

Example 3 — p-xylene, no nitric acid

A mixture of 2 ml (0.016 mol) p-xylene, 25 ml water, 0.75 g (0.0093 mol) hydrogen bromide and 2.0 g active charcoal was put in a 300 ml titanium autoclave, and pressured with oxygen to 200 psig. The charge was heated to 220° C. for 15 minutes. On working up, 1.6 g product was obtained, 100 percent conversion, 60 percent yield.

Example 4 — p-xylene with nitric acid

A mixture of 2 ml (0.016 mol) p-xylene, 25 ml water, 0.4 g (0.005 mol) hydrogen bromide, 0.05 g (0.0008 mol) nitric acid and 1 g activated charcoal was put in a glass liner in a 300 ml titanium autoclave with 200 psig oxygen. The mixture was heated at 200° C. for 15 minutes. The product was extracted with 10 ml hexane and unreacted xylene was determined by glpc analysis. The solid was treated with base, filtered to remove charcoal, and the solution acidified. The solid was 1.5 g terephthalic acid, 95 percent conversion of xylene, 57 percent yield TPA.

Comparing with Example 3, 0.35 g hydrogen bromide is replaced by 0.05 g nitric acid; with only half the charcoal present, yields are roughly equivalent.

Example 5 —

A mixture of 2 ml (0.016 mol) p-xylene, 2.3 g (0.029 mol) hydrogen bromide, 0.3 g (0.0048 mol) nitric acid, 150 ml water and 12 g activated charcoal was put in a 300 ml titanium autoclave with 200 psig oxygen. The mixture was heated at 200° C. for 15 minutes. The product was 1.7 g TPA, 66 percent yield.

Example 6 — p-toluic acid oxidation, no carbon 6.8 g (0.05 mol) of p-toluic acid, 0.4 g (0.005 mol) of hydrogen bromide, 0.05 g (0.0008 mol) $HNO_3$, and 25 ml $H_2O$, was placed in a 300 ml titanium autoclave with 200 psig $O_2$, and heated to 180° C. for 15 minutes. 7.4 g product TPA was obtained, 100 percent conversion, 88 percent yield.

Obviously, the examples can be multiplied indefinitely without departing from the scope of the invention as defined in the claims.

What is claimed is:

1. The method of converting p-toluic acid to terephthalic acid which comprise suspending it in an aqueous carrier containing from 0.04 to 20 mols of hydrogen bromide per mol of p-toluic acid in the absence of a metal catalyst, pressuring the reaction mixture with at least 50 psig of an oxygen containing gas measured at room temperature and heating the reaction mixture to between 150° to 250° C. to effect conversion of the p-toluic acid to terephthalic acid.

2. The method of claim 1, in which the reaction mixture also contains from 5 to 25 percent of nitric acid, based on hydrogen bromide.

3. The method of converting a compound selected from the group consisting of p-xylene and p-toluic acid to terephthalic acid in the absence of a metal catalyst, which comprises suspending it in an aqueous carrier containing from 0.04 to 20 mols of hydrogen bromide per mol of compound to be oxidized, and containing also at least 10 percent of activated carbon, based on the compound to be oxidized, pressuring the reaction mixture with at least 50 psig of an oxygen containing gas, measured at room temperature, and heating the reaction mixture to deliver 180° to 200° C. to effect conversion of the material to be oxidized to terephthalic acid.

4. The method of claim 3, in which the reaction mixture contains 0.04 to 1.0 mol of hydrogen bromide per mol of charge.

5. The method of claim 4, in which the reaction mixture also contains from 5 to 25 percent of nitric acid based on hydrogen bromide.

* * * * *

UNITED STATES PATENT OFFICE
CERTIFICATE OF CORRECTION

Patent No. 3,678,106             Dated 7/18/72

Inventor(s) John W. Ager

It is certified that error appears in the above-identified patent and that said Letters Patent are hereby corrected as shown below:

Column 1, line 45 "and the" should read --and in the--.

Column 3, line 27, claim 1 "comprise" should read --comprises--.

Signed and sealed this 3rd day of December 1974.

(SEAL)
Attest:

McCOY M. GIBSON JR.
Attesting Officer

C. MARSHALL DANN
Commissioner of Patents